United States Patent [19] — Engel et al.

[11] Patent Number: 4,569,965
[45] Date of Patent: Feb. 11, 1986

[54] CROTONATE-CONTAINING COPOLYMERS, PROCESSES FOR THEIR PREPARATION AND THEIR USE AS THICKENERS IN AQUEOUS SYSTEMS AND AS SIZING AGENTS

[75] Inventors: Dieter Engel, Kelsterbach; Helmut Rinno, Hofheim am Taunus; Klaus Zimmerschied, Wiesbaden, all of Fed. Rep. of Germany

[73] Assignee: Hoechst Aktiengesellschaft, Frankfurt, Fed. Rep. of Germany

[21] Appl. No.: 596,022

[22] Filed: Mar. 30, 1984

[30] Foreign Application Priority Data

Mar. 31, 1983 [DE] Fed. Rep. of Germany ....... 3311752

[51] Int. Cl.$^4$ .................... C08F 20/26; C08F 20/28
[52] U.S. Cl. .................... 524/544; 524/547; 524/558; 524/824; 524/833; 525/328.5; 525/328.9; 526/206; 526/214; 526/224; 526/318.2; 526/318.25; 526/318.41; 8/115.6; 428/245
[58] Field of Search ............... 524/824, 833, 558, 544, 524/547; 526/318, 287, 318.41, 318.2, 318.25, 206, 214, 224; 525/328.9, 328.5; 8/115.6; 428/245

[56] References Cited

U.S. PATENT DOCUMENTS

| | | | |
|---|---|---|---|
| 3,652,497 | 3/1972 | Junas | 524/522 |
| 3,894,980 | 7/1975 | DeTommaso | 524/833 |
| 3,896,070 | 7/1975 | Tümmler | 524/824 |
| 3,896,072 | 7/1975 | Tümmler | 524/824 |
| 4,075,411 | 2/1978 | Dickstein | 524/43 |
| 4,200,563 | 4/1980 | Komiya | 526/287 |
| 4,230,844 | 10/1980 | Chang | 524/765 |
| 4,337,189 | 1/1982 | Bromley | 524/824 |
| 4,427,823 | 1/1984 | Inagaki | 524/833 |

FOREIGN PATENT DOCUMENTS 0013836 8/1980 European Pat. Off. ............ 524/833

Primary Examiner—C. Warren Ivy
Attorney, Agent, or Firm—Berman, Aisenberg & Platt

[57] ABSTRACT

Copolymers prepared by emulsion or solution copolymerization, initiated by free radicals, of unsaturated copolymerizable monomers, the copolymers being built up from
(a) 1-45% by weight of ethylenically unsaturated carboxylic acids,
(b) 0.5-30% by weight of a surface-active crotonic acid ester,
(c) 30-85% by weight of methacrylic acid esters or acrylic acid esters of aliphatic ($C_1$-$C_{18}$)-alcohols,
(d) 0-40% by weight of other ethylenically unsaturated comonomers,
(e) 0-3% by weight of polyethylenically unsaturated compounds and
(f) 0-5% by weight of molecular weight regulators, and, if appropriate, the free acid groups of the copolymers subsequently having been partly or completely neutralized by addition of bases and converted into water-soluble or colloidally water-dispersible copolymer salts.

In addition, processes for the preparation of the copolymers by solution or emulsion copolymerization and, if appropriate, subsequent conversion thereof into the copolymer salts, and the use of the products as viscosity-increasing and rheology-modifying substances in aqueous systems, in particular aqueous dispersions, preferably for thickening emulsion paints, emulsion gloss lacquers, textile printing pastes and paper printing pastes, and furthermore as sizing agents in the textile industry.

31 Claims, No Drawings

CROTONATE-CONTAINING COPOLYMERS, PROCESSES FOR THEIR PREPARATION AND THEIR USE AS THICKENERS IN AQUEOUS SYSTEMS AND AS SIZING AGENTS

The invention relates to crotonate-containing copolymers, processes for their preparation and their use as viscosity-increasing substances in aqueous systems, in particular aqueous dispersions, with a surprising thickening and rheology-modifying action, and furthermore their use as sizing agents in the textile industry.

Copolymers containing salts of methacrylic acid or acrylic acid and alkyl esters of these unsaturated carboxylic acids as well as a surface-active comonomer are already known.

Thus, U.S. Pat. No. 3,652,497 describes copolymers of 5–30% by weight of an unsaturated ($C_2$–$C_6$)-carboxylic acid and 70–95% by weight of an alkylphenoxypoly-($C_2$–$C_3$)-alkylene oxide ($C_2$–$C_3$)-alkyl ester of an unsaturated ($C_2$–$C_6$)-carboxylic acid. The amount of surface-active, unsaturated ester in these copolymers is exceptionally high. As a consequence thereof and of the fact that exclusively an unsaturated carboxylic acid is used as the comonomer, their use as thickeners in aqueous systems results, for example, in an increased water-sensitivity of emulsion gloss paints which have been thickened with these copolymers. The content of water-soluble comonomers in the thickener copolymer is 100% here.

European Pat. No. 0,003,235 describes the preparation of water-soluble copolymers of 2–80% by weight of an unsaturated ($C_3$–$C_5$)-carboxylic acid, less than 50% by weight of another ethylenically unsaturated monomer and 20–98% by weight of an acrylate or methacrylate, the alcohol component of which consists of an ethoxylated ($C_1$–$C_{20}$)-alkanol. Because of the pronounced water-solubility of these copolymers, deterioration in the resistance to water also occurs here when they are used as thickeners in emulsion gloss paints ($\geq 50\%$ by weight of water-soluble comonomers in the thickener copolymer).

European Pat. No. 0,011,806 and European Pat. No. 0,013,836 describe copolymers consisting of 15–60% by weight of an unsaturated carboxylic acid, 15–80% by weight of a non-ionic monomer and 1–30% by weight of an ester of acrylic or methacrylic acid with an ethoxylated ($C_8$–$C_{20}$)-alkyl or ($C_8$–$C_{16}$)-alkylphenyl or a ($C_8$–$C_{30}$)-alkyl, -alkyl-aryl or -polycyclic-alkyl alcohol. European Pat. No. 0,013,836 also describes the use of a crosslinking agent in amounts of 0–1% by weight. In the neutralized state, the copolymers thus prepared have remarkable capacities as thickeners. The use of molecular weight regulators is also mentioned in European Pat. No. 0,013,836.

U.S. Pat. No. 4,230,844 describes copolymers of 30–65% by weight of unsaturated carboxylic acid and 35–70% by weight of a surface-active unsaturated ester of an ethoxylated ($C_8$–$C_{20}$)-alkyl alcohol. These copolymers thus also consist entirely of water-soluble monomers, so that their use as thickeners in emulsion gloss paints leads to a reduction in the water-resistance.

European Pat. No. 0,013,836 and U.S. Pat. No. 4,230,844 describe the particular influence of the copolymers described above on the rheological properties of dispersed systems (for example latices, copolymer dispersions and emulsion gloss paints). Their action consists in the achievement of a balancing of technologically desirable properties of aqueous systems. For example, in a latex (an emulsion gloss paint and the like), both the high-shear viscosity, which influences the "film condition" and the brush-resistance, and the low-shear viscosity, which determines the film flow, can be influenced.

The preparation of a surface-active crotonic acid ester is described in U.S. Pat. No. 4,075,411. The alcohols used here are exclusively ethoxylated ($C_8$–$C_{20}$)-alkylphenols. Copolymerization of these crotonate monomers with other monomers is mentioned. However, the products in the examples do not contain unsaturated carboxylic acids and have neither thickening nor rheology-modifying properties.

Nevertheless, the products described hitherto frequently only inadequately fulfill the technical requirements in practice in respect of their total spectrum of properties, such as water-resistance, gloss, molding-sharpness, flow, brush-resistance and effectiveness at low concentrations in aqueous emulsion paints.

The invention was thus based on the object of preparing a rheology-modifying copolymer which, in as low as possible a concentration, i.e. with a high thickener capacity, can influence the rheology of aqueous systems with the particular effect that high viscosities coupled with high-shear gradients can be achieved in aqueous systems and that, in the final emulsion lacquer, the water-resistance of the latter is not impaired by soluble constituents.

The requirement of high high-shear viscosity (=REL viscosity) is explained by the fact that, because of the brush-resistance, the consumer must use a significantly greater force to distribute the paint for example when brushing on paints with a relatively high high-shear viscosity, compared with paints which do not display an adequate brush-resistance on the brush. Control of the amount of paint brushed on per unit area, i.e. the coating thickness of the paint applied, is thereby established almost by itself when the abovementioned thickeners are used, because if brushing on is too extensive, the brush-resistance rises perceptibly because the shear gradient increases as the coating thickness decreases. The requirement of low low-shear viscosity is derived from the fact that this influences the flow of the paint after application. A low low-shear viscosity is thus a fundamental condition for good flow. An increase in the water-resistance of aqueous emulsion lacquers after application is a further requirement.

Surprisingly, it has now been possible to achieve the object thus formulated by the copolymers characterized below.

The invention relates to copolymers prepared by emulsion or solution copolymerization, initiated by free radicals, of unsaturated, copolymerizable monomers and, where relevant, subsequent partial or complete neutralization of the free acid groups of the copolymers by addition of bases, which copolymers are built up from (a) 1–45% by weight of ethylenically unsaturated ($C_3$–$C_5$)-monocarboxylic acids, ethylenically unsaturated ($C_4$–$C_6$)-dicarboxylic acids or monoesters thereof with aliphatic ($C_1$–$C_8$)-alcohols, or mixtures of these monomers, preferably methacrylic acid, acrylic acid, crotonic acid, maleic acid, monoalkyl maleates or mixtures thereof, (b) 0.5 to 30% by weight of a surface-active crotonic acid ester of the general formula I

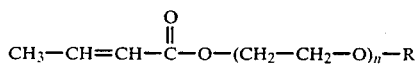

in which
n denotes a number from 2 to 100 and
R denotes an aliphatic ($C_2$–$C_{30}$)-radical, which can be linear or branched, a mono-, di- or tri-alkylphenyl radical with alkyl groups of, in each case, 4 to 12 carbon atoms or a block-copolymeric radical of the formula IIa or IIb

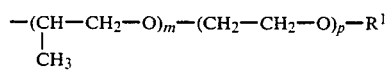

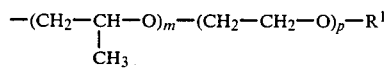

in which
m represents a number from 10 to 100, p represents a number from 0 to 100 and
$R^1$ represents H, crotyl, ($C_1$–$C_{20}$)-alkyl, phenyl or alkylphenyl with ($C_1$–$C_{20}$)-alkyl groups, or R denotes a perfluorinated or partially fluorinated ($C_1$–$C_{16}$)-alkyl radical, (c) 30–85% by weight of methacrylic acid esters or acrylic acid esters of aliphatic ($C_1$–$C_{18}$)-alcohols or a mixture of these esters, (d) 0–40% by weight of other ethylenically unsaturated comonomers, preferably vinyl esters, vinylaromatics, ethylenically unsaturated nitriles, esters of ethylenically unsaturated monocarboxylic and dicarboxylic acids, where these have not already been listed above under (c), ethylenically unsaturated sulfonic acids or ethylenically unsaturated sulfonic acid derivatives, (e) 0–3% by weight of polyethylenically unsaturated compounds, preferably divinylbenzene, diallyl phthalate and butanediol diacrylate or dimethacrylate and (f) 0–5% by weight of molecular weight regulators, preferably dodecylmercaptan, tetrakis-mercaptoacetyl-pentaerythritol, carbon tetrachloride or bromotrichloromethane.

On partial or complete neutralization, the copolymers become increasingly to completely water-soluble or colloidally dispersible in water. In the partially or completely neutralized form, they can act and be used as thickeners of aqueous systems with rheology-modifying properties in the abovementioned sense.

The invention thus furthermore relates to the copolymers, according to the invention described above, in partially or completely base-neutralized water-soluble or colloidally water-dispersible form.

A preferred application method for the copolymers according to the invention consists, for example, of admixing them (in their non-neutralized and in general water-insoluble acid form as solutions in suitable solvents or, in particular, as low-viscosity aqueous dispersions) with the aqueous or water-containing system to be thickened and then partially or completely neutralizing the resulting mixture with bases, such that the copolymers are converted into a water-soluble salt form, displaying their thickening and rheology-modifying action.

Examples of preferred compounds of component (a) of the copolymers according to the invention are crotonic acid, maleic acid, itaconic acid and maleic acid monoesters and itaconic acid monoesters of straight-chain or branched ($C_1$–$C_8$)-alcohols. Acrylic acid and methacrylic acid are particularly preferred.

In the case of the monomers of component (b), preferred compounds of the formula I

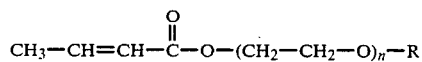

in which
n and R have the abovementioned meanings, are those where n=10–80, in particular n=20–50, and also those where
R=n- or iso-($C_2$–$C_{30}$)-alkyl, preferably ($C_{12}$–$C_{20}$)-alkyl and in particular ($C_{16}$–$C_{18}$)-alkyl, such as, for example, n- or iso-octyl, n- or iso-decyl, n- or iso-dodecyl, n- or iso-hexadecyl, n- or iso-octadecyl or mixtures of these radicals, so that, for example, crotonic acid esters with 10 ethylene oxide units and a $C_{12}$-alkyl radical or with 20 ethylene oxide units and an iso-octyl radical, or with 50 ethylene oxide units and a $C_{18}$-alkyl radical can result, or monoalkylphenyl with ($C_4$–$C_{12}$)-n- or iso-alkyl groups, preferably $C_8$- or $C_9$-n- or iso-alkyl groups, such as, for example, iso-octylphenyl or iso-nonylphenyl, with which, for example, crotonic acid esters with 5 ethylene oxide units and an iso-octylphenyl radical, or with 11 ethylene oxide units and an iso-nonylphenyl radical can result, or dialkylphenyl with ($C_4$–$C_{12}$)-n- or iso-alkyl groups, such as, for example, diisobutylphenyl, diisooctylphenyl or diisononylphenyl, with which, for example, crotonic acid esters with 20 ethylene oxide units and a diisobutylphenyl radical, or 50 ethylene oxide units and a diisooctylphenyl radical, or 80 ethylene oxide units and a diisononylphenyl radical can result, or trialkylphenyl with ($C_4$–$C_{12}$)-n- or iso-alkyl groups, such as, for example, triisobutylphenyl, triisooctylphenyl or triisononylphenyl, with which, for example, crotonic acid esters of 11 ethylene oxide units and a triisobutylphenyl radical, or 23 ethylene oxide units and a triisononylphenyl radical, or 50 ethylene oxide units and a triisooctylphenyl radical, can result, or a radical of the formula IIa or IIb

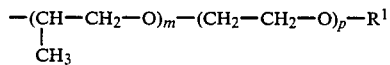

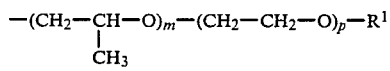

preferably such a radical with m=20–80 and p=0–80, in particular 0–50, and preferably $R^1$=H, ($C_1$–$C_{20}$)-n- or iso-alkyl, n- or iso-alkylphenyl with ($C_1$–$C_{20}$)-alkyl groups, phenyl or crotyl, from which crotonic acid esters of ethylene oxide/propylene oxide copolymers with, for example, p=20, m=20 and an iso-butyl radical, or p=30, m=40 and a crotyl radical, or p=50 and m=80, or m=20, p=0 and a nonylphenyl radical, can result, or ($C_2$–$C_{16}$)-perfluoroalkyl or partially fluorinated alkyl.

Mixtures of the monomers mentioned can also be employed, in which case it should be taken into consideration that the compounds to be employed as a rule are prepared from industrial intermediates which may have, for example, a certain distribution range in respect of their degree of oxyethylation or their molecular weight distribution.

Preferred compounds of component (c) are methyl, ethyl, isopropyl, isobutyl, tert.-butyl and n-butyl acrylate and methacrylate. The methyl and ethyl esters of acrylic and methacrylic acid are particularly preferred.

Particularly suitable compounds of component (d) are: vinyl esters of $(C_1-C_{12})$-carboxylic acids, such as acetic acid, propionic acid, 2-ethylhexanoic acid, versatic acid 9, versatic acid 10, lauric acid and furthermore unsaturated aromatic compounds, such as styrene or vinyltoluene, and furthermore esters of unsaturated monocarboxylic and dicarboxylic acids with $C_8$-alcohols or higher alcohols, such as acrylic and methacrylic acid esters, for example dodecyl acrylate or octadecyl methacrylate, or crotonic acid esters of $(C_1-C_8)$-alchols, such as, for example, methyl crotonate or 2-ethylhexyl crotonate, or maleic or itaconic acid esters with $(C_1-C_8)$-alcohols, such as, for example, dimethyl maleate, dibutyl maleate, di-2-ethylhexyl maleate or dimethyl itaconate, or acrylic acid monoesters or methacrylic acid monoesters of diols and triols, such as, for example, ethylene glycol, butene-1,4-diol, hexane-1,6-diol, glycerol and trimethylolpropane, or unsaturated nitriles, such as acrylonitrile or methacrylonitrile, or unsaturated sulfonic acids, preferably ethylenesulfonic acid or acrylamidopropanesulfonic acid, or, preferably, salts thereof, in particular alkali metal or ammonium salts.

Particularly suitable compounds of component (e) are: diallyl phthalate, divinylbenzene, butanediol methacrylate, ethanediol dimethacrylate, hexanediol dimethacrylate, ethanediol diacrylate, butanediol diacrylate, hexanediol diacrylate, pentaerythritol triacrylate, trimethylolpropane triacrylate, tetraethylene glycol diacrylate, tripropylene glycol diacrylate and trimethylolpropane trimethacrylate.

A copolymer built up from components (a) to (f) according to the invention can be prepared, for example, by conventional solution copolymerization initiated by free radicals in conventional solvents or in the form of a dispersion by conventional emulsion copolymerization. If the preparation is via emulsion copolymerization, the solids content of the resulting dispersion is preferably between 10 and 55% by weight. Emulsion copolymerization is the preferred preparation process, the surface-active comonomer (b) preferably being initially introduced into the aqueous phase.

The conventional processes for copolymerization in organic media using free radical initiators can be used for preparation by solution copolymerization. Emulsion copolymerization can likewise be carried out by conventional methods, i.e. the conventional ionic and nonionic emulsifiers can be used for emulsifying the monomers and stabilizing the latex. Examples of suitable anionic emulsifiers are: alkyl sulfates, alkylaryl sulfates, alkylarylsulfonates and alkali metal and/or ammonium salts of alkyl or alkylaryl polyglycol ethersulfates, and examples of suitable non-ionic emulsifiers are: oxyethylated fatty alcohols and oxyethylated alkylphenols. The amount of emulsifier used is in general 0.3-5% by weight, based on the total weight of monomer.

The invention thus furthermore relates to a process for the preparation of copolymers by emulsion or solution copolymerization, initiated by free radicals, of unsaturated, copolymerizable monomers and, where relevant, subsequent partial or complete neutralization of the free acid groups of the copolymers by addition of bases, which comprises copolymerizing, as monomers, (a) 1-45% by weight of ethylenically unsaturated $(C_3-C_5)$-monocarboxylic acids, ethylenically unsaturated $(C_4-C_6)$-dicarboxylic acids or monoesters thereof with aliphatic $(C_1-C_8)$-alcohols, or mixtures of these monomers, preferably methacrylic acid, acrylic acid, crotonic acid, maleic acid, monoalkyl maleates or mixtures thereof, (b) 0.5 to 30% by weight of a surface-active crotonic acid ester of the general formula I

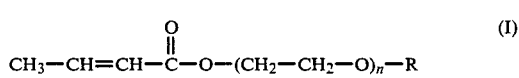

in which n denotes a number from 2 to 100 and

R denotes an aliphatic $(C_2-C_{30})$-radical, which can be linear or branched, a mono-, di- or tri-alkylphenyl radical with alkyl groups of, in each case, 4 to 12 carbon atoms or a block-copolymeric radical of the formula IIa or IIb

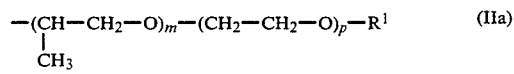

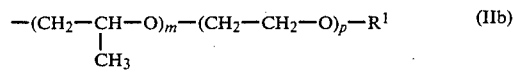

in which m represents a number from 10 to 100, p represents a number from 0 to 100 and $R^1$ represents H, crotyl, $(C_1-C_{20})$-alkyl, phenyl or alkylphenyl with $(C_1-C_{20})$-alkyl groups, or R denotes a perfluorinated or partially fluorinated $(C_1-C_{16})$-alkyl radical, (c) 30-85% by weight of methacrylic acid esters or acrylic acid esters of aliphatic $(C_1-C_{18})$-alcohols or a mixture of these esters, (d) 0-40% by weight of other ethylenically unsaturated comonomers, preferably vinyl esters, vinylaromatics, ethylenically unsaturated nitriles, esters of ethylenically unsaturated monocarboxylic and dicarboxylic acids, where these have not already been listed above under (c), ethylenically unsaturated sulfonic acids or ethylenically unsaturated sulfonic acid derivatives, (e) 0-3% by weight of polyethylenically unsaturated compounds, preferably divinylbenzene, diallyl phthalate and butanediol diacrylate or dimethacrylate and (f) 0-5% by weight of molecular weight regulators, preferably dodecylmercaptan, tetrakis-mercaptoacetyl-pentaerythritol, carbon tetrachloride or bromotrichloromethane, and, if appropriate, converting the resulting copolymer into a water-soluble or colloidally water-dispersible copolymer salt by neutralization with bases, preferably with alkali metal, ammonium or amine bases.

The preferred procedure is emulsion copolymerization, and in this, in turn, the surface-active comonomer (b) is preferably initially introduced into the aqueous phase. The content of copolymer in the aqueous dispersions prepared according to the invention is preferably 10 to 55% by weight, in particular 25 to 50% by weight.

The following factors, inter alia, should be considered when choosing the type and proportions of the comonomers (a) to (e). The use of the unsaturated carboxylic acids listed as component (a) contributes to ensuring easy dispersibility of the copolymers according to the invention in aqueous dispersion. In the partially or completely neutralized form, component (a) also, inter alia, contributes decisively to achieving the water-solubility or colloidal water-dispersibility of the copolymer salts according to the invention.

It should also be taken into consideration that copolymerization of the particular comonomers used with one another must in principle be possible, and that it also actually takes place. In the simplest case, this can be estimated with the aid of the copolymerization parameters or the Q- and e-values (compare, for example, B. Brandrup, Immergut, Polymer Handbook, 2nd edition (1975), John Wiley & Sons, New York). Under certain circumstances, when choosing certain comonomers (a)–(e), the monomer mixture ratio must be chosen according to how copolymerization is possible by varying the synthesis method and, inter alia, specifically the manner in which the monomer is metered in. Thus, if appropriate, under certain circumstances, copolymerization reactions can be forced by initially introducing one or more monomer components and only metering in the remaining monomer or the remaining monomer mixture in the course of the polymerization. In the case of emulsion copolymerization, whether the monomer is metered in by itself or as an aqueous emulsion may be of decisive importance in this connection. The same applies here also to the manner in which the emulsifier is added. Differences in respect of particle size, particle size distribution and stability of the copolymer dispersion can thereby be observed, depending on whether the emulsifier is initially introduced or whether it is metered in during the copolymerization.

Component (b) is the constituent of the copolymers according to the invention which probably most contributes to the development of the desired overall properties for use in aqueous emulsion varnishes. Since crotonic acid esters undergo self-polymerization only with difficulty or not at all, their use in copolymerization reactions cannot lead to segments of surface-active crotonic acid esters in the copolymer. The action of the resulting copolymer as a thickener and rheology-modifier can be influenced by varying the length of the ethylene oxide chain in the crotonic acid ester. Thus, for example, the viscosity-increasing action of the copolymer in the high-shear and low-shear ranges in disperse aqueous systems increases as the ethylene oxide chain length increases.

The relative amounts of components (a) to (d) can vary within a relatively wide range. They can preferably be (a) 1–45% by weight, (b) 0.5–30% by weight, (c) 30–85% by weight and (d) 0–40% by weight; (a) 5–40% by weight, (b) 1–25% by weight, (c) 40–80% by weight and (d) 0–35% by weight are particularly preferred; (a) 8–40% by weight, (b) 3–20% by weight, (c) 50–75% by weight and (d) 0–30% by weight are very particularly preferred.

The conventional water-soluble initiators which start free radical chains are preferably used in amounts of 0.01–2% by weight, based on the total amount of monomer, to initiate the emulsion copolymerization. Examples of these initiators are, inter alia, alkali metal persulfates or ammonium persulfate. The polymerization temperature is adjusted in the conventional manner according to the half-lives of the initiators.

To increase the thickener capacity or for further influencing of the rheological properties of the dissolved copolymers in aqueous systems, it may in some cases be advantageous also to use a polyethylenically unsaturated compound as a comonomer. Comonomers of this type which can be used are crosslinking comonomers, such as, for example, diallyl phthalate, divinylbenzene, allyl methacrylate or ethylene glycol dimethacrylate. The amounts used can be varied within a range from 0 to 3% by weight, preferably 0 to 1% by weight, based on the total amount of monomer. During the polymerization, branches or networks develop which, after more or less complete neutralization of the copolymer, may lead to the formation of gel structures and hence to the development of specific rheological property profiles.

Finally, the use of molecular weight regulators during the copolymerization leads to relatively low molecular weights of the copolymers. The viscosity of the aqueous solutions of such copolymers thus falls, compared with the non-regulated products. The possibility of adjusting the required balance between high high-shear viscosity and low low-shear viscosity in a controlled manner for specific application systems can in this way be improved. All compounds which have the property of transferring free radicals can be used as the regulators. Preferred examples here are mercaptans (monofunctional and polyfunctional), such as, for example, n- and t-dodecylmercaptan, tetrakis-mercaptoacetyl-pentaerylthritol and thioglycolic acid. However, other compounds can also be used as regulators, such as, for example α-methylstyrene, toluene, trichlorobromomethane and carbon tetrachloride. The amount of regulator used can thereby be varied within a range of 0 to 5% by weight, based on the total amount of monomer.

The thickener capacity of copolymers according to the invention can additionally be influenced by the (further) addition of ionic or non-ionic emulsifiers to the aqueous system, especially before, but also after, the free acid groups of the copolymer have been neutralized. If, for example, 0.01–5% by weight of the copolymer according to the invention (based on the solid) is used as a thickener for thickening an aqueous system containing dispersed solids, the advantageous range for any further amounts of emulsifier to be added is between 0.01 and 10% by weight (based on the solid).

It has now been found, surprisingly, that the copolymers or copolymer salts or partial salts prepared according to the invention with a surface-active ester of crotonic acid have significantly higher thickener capacities in aqueous solution than comparable copolymers or salts thereof which have been prepared under identical conditions with corresponding surface-active esters of methacrylic acid or of acrylic acid instead of the surface-active crotonic acid ester. It has been possible to observe the better thickener capacity of the copolymers according to the invention both in the high-shear range (shear gradient $D = 10,000$ $s^{-1}$) and in the low-shear range ($D = 0.1$ $s^{-1}$). This has, inter alia, the advantage that smaller use amounts of the thickener according to the invention are required to impart certain rheological properties to aqueous systems, compared with the use of corresponding copolymers containing acrylate or methacrylate components instead of the crotonate component.

The copolymers according to the invention are preferably used as thickeners in their partly or completely base-neutralized water-soluble or colloidally water-dispersible form for thickening aqueous systems and imparting to them particular rheological properties. Whilst the copolymers according to the invention in their free acid form are preferably water-insoluble products, their salts with bases, in particular the alkali metal, ammonium or amine salts, are water-soluble, giving clear solutions, or water-dispersible in colloidal form. The copolymers are preferably and advantageously used as thickeners in a manner such that they are first admixed as a low-viscosity solution in a suitable solvent or as an aqueous copolymer dispersion of low viscosity to the aqueous system to be thickened, and the resulting mixture, including, for example, all the pigments and lacquer constituents optionally contained therein, is then partly or completely neutralized or rendered slightly alkaline, for example to pH values of 5-10.5, in particular 8-9.5, by addition of a base. The copolymers are preferably mixed in the form of aqueous dispersions with the aqueous systems to be thickened.

Preferred fields of use for the copolymers according to the invention are the thickening and viscosity adjustment of disperse aqueous systems, such as, for example, preferably, emulsion paints, emulsion gloss lacquers, textile printing pastes and paper printing pastes, and furthermore biocidally-active-compound dispersions for plant protection and combating pests, liquid fertilizers, emulsion cleaning agents, discharge pastes, de-icing agents or cosmetic formulations. A further interesting application of the copolymers according to the invention is their use as sizing agents, in the textile industry, which can easily be washed out by alkaline liquors or as sizing agent components.

In aqueous emulsion gloss lacquers, for example, the use of the copolymers according to the invention particularly advantageously leads to the development of the rheological properties desired by the user, such as "high" high-shear viscosity and "low" low-shear viscosity. High high-shear viscosity is understood as meaning values between 2 and 3.5 poise at $D=10,000$ s$^{-1}$, and low low-shear viscosity is understood as meaning values of about 50–100 poise at $D=0.1$ s$^{-1}$ and below.

The amounts of copolymers according to the invention to be used are not critical. However, in the case of use as a thickener, they are preferably in the range from 0.01 to 5% by weight of copolymer, based on the aqueous system to be thickened.

The invention is illustrated in more detail by the examples which follow.

EXAMPLE 1

Synthesis of the surface-active crotonic acid ester (b)

828 g of oxyethylated ($C_{16}$–$C_{18}$)-fatty alcohol (n=50) were dried azeotropically in 828 g of toluene. After about 1.5 hours, 55.8 g of crotonic anhydride were added. The solution was boiled under reflux for a further 2.5 hours. After cooling, the toluene was stripped off in vacuo. Yield: 883 g of a brownish-yellow, water-soluble product of waxy consistency. The conversion check was made by thin layer chromatography.

The corresponding crotonic acid esters (a) and (c) to (o), which are likewise surface-active, were prepared from the oxyethylated alcohol components listed below under (a) and (c) to (o) analogously to the above instructions for the surface-active crotonic acid ester (b).

| | Alcohol component | Degree of oxyethylation (moles of ethylene oxide) |
|---|---|---|
| (a) | oxyethylated ($C_{16}$–$C_{18}$)-fatty alcohol | 80 |
| (b) | " | 50 |
| (c) | " | 25 |
| (d) | " | 15 |
| (e) | " | 11 |
| (f) | oxyethylated tributylphenol | 50 |
| (g) | " | 30 |
| (h) | " | 18 |
| (i) | oxyethylated ($C_{12}$–$C_{16}$)-perfluoro-alcohol | 8 |
| (j) | oxyethylated ($C_{12}$–$C_{16}$)-perfluoro-alcohol | 13 |
| (k) | oxyethylated nonylphenol | 30 |
| (l) | " | 23 |
| (m) | " | 14 |
| (n) | " | 8 |
| (o) | crotonate of a propylene oxide/ethylene oxide block copolymer | |

EXAMPLE 2

Synthesis of copolymers according to the invention by emulsion polymerization

Preparation of sample 1

28 g of the Na salt of an alkylaryl polyglycol ether-sulfate (50% strength by weight) were dissolved in 738 g of demineralized water (=E-water) in a (2 liter) 3-necked flask with a stirrer, reflux condenser and internal thermometer, and the solution was warmed to 80° C., with stirring. 10 ml of an initiator solution consisting of 0.25 g of ammonium persulfate in 50 g of E-water, and 50 g of a monomer mixture consisting of 252 g of ethyl acrylate, 63 g of acrylic acid and 35 g of surface-active crotonic acid ester (b) from Example 1 were added. The remainder of the monomer mixture was then metered in, starting after half an hour and over a period of 2 hours, together with the remainder of the initiator solution. When the metering in had ended, the mixture was after-heated for a further hour, stirring being continued, and the batch was then brought to room temperature. Solids content of the dispersion: 30.1% by weight. The percentage composition of the copolymer content of sample 1 is given in Table 1.

Samples 2 to 12, likewise in dispersion form, were prepared from the particular monomer constituents and amounts listed in Table 1 in the same way as sample 1, by analogous emulsion polymerization reactions. The regulators and crosslinking agents also used in some cases were in each case admixed to the monomer mixture in the amounts given, based on the total amount of monomer.

By neutralizing the dispersions with aqueous sodium hydroxide solution or with aqueous ammonia, it was possible to convert the copolymer constituents of samples 1 to 12 into water-soluble products with the desired thickening and rheology-modifying properties.

TABLE 1

Composition of the copolymer constituents of dispersions 1 to 12 in % by weight of monomer units, in each case based on the copolymer without the regulator and cross-linking agent contents.

| Sample No. | Ethyl acrylate (% by weight) | Acrylic acid (% by weight) | Meth-acrylic acid (% by weight) | Surface acitve crotonate from Example 1(b) (% by weight) | Regulator: n-dodecyl-mercaptan (% by weight) | Cross-Linking agent divinyl-benzene (% by weight) |
|---|---|---|---|---|---|---|
| 1  | 72 | 18 | —  | 10 | —   | —    |
| 2  | 72 | 18 | —  | 10 | 0.2 | —    |
| 3  | 72 | 18 | —  | 10 | 0.5 | —    |
| 4  | 72 | 18 | —  | 10 | 1.0 | —    |
| 5  | 80 | 20 | —  | —  | —   | —    |
| 6  | 80 | 20 | —  | —  | 0.2 | —    |
| 7  | 55 | 20 | 5  | 20 | 0.2 | —    |
| 8  | 50 | 20 | 10 | 20 | 0.2 | —    |
| 9  | 40 | 20 | 20 | 20 | 0.2 | —    |
| 10 | 72 | 18 | —  | 10 | 0.2 | 0.25 |
| 11 | 72 | 18 | —  | 10 | 0.2 | 0.5  |
| 12 | 72 | 18 | —  | 10 | 0.2 | 1.0  |

EXAMPLE 3

Samples 13 to 26 were prepared in dispersion form from the particular monomer constituents and amounts listed in Table 2 below in the same way as described in Example 2 by analogous emulsion polymerization reactions. The regulator also used in some cases was in each case admixed to the monomer mixture in the given amounts, based on the total amount of monomer. The designation of the surface-active crotonic acid ester in column 6 of Table 2 relates to the data in Example 1.

By neutralizing the dispersions with aqueous sodium hydroxide solution or with aqueous ammonia, it was possible to convert the copolymer constituents of samples 13 to 26 into water-soluble products with the desired thickening and rheology-modifying properties.

TABLE 2

Composition of the copolymer constituents of dispersions 13 to 26 in % by weight of monomer units, in each case based on the copolymer without the regulator content.

| Sample No. | Ethyl acrylate (% by weight) | Meth-acrylic acid (% by weight) | Acrylic acid (% by weight) | Styrene (% by weight) | Surface-active crotonate Example 1 from No. | Surface-active crotonate (% by weight) | Regulator: n-dodecyl-mercaptan (% by weight) |
|---|---|---|---|---|---|---|---|
| 13 | 40 | 45 | —  | —  | 1g | 15 | —   |
| 14 | 40 | 40 | —  | —  | 1i | 20 | 0.1 |
| 15 | 30 | 40 | —  | —  | 1c | 30 | 0.5 |
| 16 | 45 | 35 | —  | —  | 1h | 15 | 0.3 |
| 17 | 50 | 45 | —  | —  | 1f | 5  | 0.2 |
| 18 | 60 | 30 | —  | —  | 1l | 20 | —   |
| 19 | 45 | 25 | —  | —  | 1j | 30 | 0.2 |
| 20 | —  | —  | 10 | 80 | 1f | 10 | 0.2 |
| 21 | —  | —  | 20 | 70 | 1f | 10 | 0.2 |
| 22 | —  | 20 | 10 | 60 | 1f | 10 | 0.2 |
| 23 | —  | 40 | —  | 55 | 1h | 5  | 0.1 |
| 24 | —  | 30 | —  | 65 | 1h | 5  | 0.3 |
| 25 | —  | 40 | —  | 40 | 1m | 20 | 0.2 |
| 26 | —  | 45 | —  | 45 | 1g | 10 | —   |

We claim:

1. A free-radical-(emulsion or solution)-copolymerized copolymer of unsaturated copolymerizable monomers, its emulsion or solution wherein said copolymer is that (based on 100 percent by weight of monomers) of:

I. from 1 to 45 percent by weight of at least one monomer selected from the group consisting of an ethylenically-unsaturated (C₃–C₅)-monocarboxylic acid, an ethylenically-unsaturated (C₄–C₆)-dicarboxylic acid and a monoester of an ethylenically-unsaturated (C₄–C₆)-dicarboxylic acid, II. from 0.5 to 30 percent by weight of a surface active crotonic acid ester of formula I

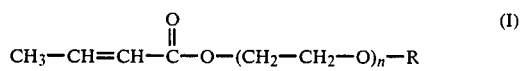

wherein n denotes a number from 2 to 100,

R denotes (a) a linear or branched (C₂–C₃₀)-aliphaticradical, (b) a (mono-, di- or tri-alkyl)phenyl radical, each alkyl of which has from 4 to 12 carbon atoms, (c) a perflurorinated or partially fluorinated (C₁–C₁₆)-alkyl radical, or (d) a block-copolymer radical of one of formulae IIa and IIb

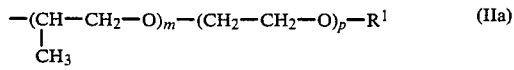

$$-(CH_2-CH-O)_m-(CH_2-CH_2-O)_p-R^1 \quad \text{(IIb)}$$
$$\phantom{-(CH_2-}|\phantom{CH-O)_m}$$
$$\phantom{-(CH_2-}CH_3$$

m represents a number from 10 to 100,
p represents a number from 0 to 100 and
$R^1$ represents H, crotyl, $(C_1-C_{20})$-alkyl, phenyl or alkylphenyl, the alkyl of which is $(C_1-C_{20})$-alkyl, III. from 30 to 85 percent by weight of at least one ester of an aliphatic $(C_1-C_{18})$-alcohol, each ester being that of methacrylic acid or of acrylic acid, IV. from 0 to 40 percent by weight of another ethylenically-unsaturated comonomer, V. from 0 to 30 percent by weight of polyethylenically-unsaturated monomer, and VI. from 0 to 5 percent by weight of a molecular weight regulator.

2. A copolymer as claimed in claim 1, which is in partly or completely base-neutralized water-soluble or colloidally water-dispersible form.

3. A copolymer as claimed in claim 1 wherein (I) comprises at least one member selected from the group consisting of methacrylic acid, acrylic acid, crotonic acid, maleic acid and a monoalkyl maleate.

4. A copolymer as claimed in claim 3 wherein (IV) comprises an ethylenically-unsaturated sulfonic acid, an ethylenically-unsaturated sulfonic acid derivative or a member selected from the group consisting of a vinyl ester, a vinyl aromatic, an ethylenically-unsaturated nitrile, an ethylenically-unsaturated monocarboxylic acid ester and an ethylenically-unsaturated dicarboxylic acid ester.

5. A copolymer as claimed in claim 4 wherein (V) comprises a monomer selected from the group consisting of divinylbenzene, diallyl phthalate, butenediol diacrylate and butanediol dimethacrylate.

6. A copolymer as claimed in claim 5 wherein (VI) comprises a member selected from the group consisting of dodecylmercaptan, tetrakis-mercaptoacetyl-pentaerythritol, carbon tetrachloride and bromotrichloromethane.

7. A copolymer as claimed in claim 1 wherein (IV) comprises an ethylenically-unsaturated sulfonic acid, an ethylenically-unsaturated sulfonic acid derivative or a member selected from the group consisting of a vinyl ester, a vinyl aromatic, an ethylenically-unsaturated nitrile, an ethylenically-unsaturated monocarboxylic acid ester and an ethylenically-unsaturated dicarboxylic acid ester.

8. A copolymer as claimed in claim 1 wherein (V) comprises a monomer selected from the group consisting of divinylbenzene, diallyl phthalate, butenediol diacrylate and butanediol dimethacrylate.

9. A copolymer as claimed in claim 1 wherein (VI) comprises a member selected from the group consisting of dodecylmercaptan, tetrakis-mercaptoacetyl-pentaerythritol, carbon tetrachloride and bromotrichloromethane.

10. A copolymer as claimed in claim 2 wherein (I) comprises at least one member selected from the group consisting of methacrylic acid, acrylic acid, crotonic acid, maleic acid and a monoalkyl maleate.

11. A copolymer as claimed in claim 2 wherein (IV) comprises an ethylenically-unsaturated sulfonic acid, an ethylenically-unsaturated sulfonic acid derivative or a member selected from the group consisting of a vinyl ester, a vinyl aromatic, an ethylenically-unsaturated nitrile, an ethylenically-unsaturated monocarboxylic acid ester and an ethylenically-unsaturated dicarboxylic acid ester.

12. A copolymer as claimed in claim 2 wherein (V) comprises a monomer selected from the group consisting of divinylbenzene, diallyl phthalate, butanediol diacrylate and butanediol dimethacrylate.

13. A copolymer as claimed in claim 2 wherein (VI) comprises a member selected from the group consisting of dodecylmercaptan, tetrakis-mercaptoacetyl-pentaerythritol, carbon tetrachloride and bromotrichloromethane.

14. A copolymer as claimed in claim 1 wherein R is a $(C_2-C_3)$-aliphatic radical.

15. A copolymer as claimed in claim 1 wherein R is a (mono-, di- or tri-alkyl)phenyl radical.

16. A copolymer as claimed in claim 1 wherein R is a perfluorinated or partially fluorinated $(C_1-C_{16})$-alkyl radical.

17. A copolymer as claimed in claim 1 wherein R is a block-copolymer radical of one of formulae IIa and IIb.

18. A process for the preparation of a copolymer by free-radical-initiated emulsion or solution copolymerization of unsaturated, copolymerizable monomers which comprises copolymerizing, as monomers, (a) 1–45% by weight of ethylenically unsaturated $(C_3-C_5)$-monocarboxylic acid, ethylenically unsaturated $(C_4-C_6)$-dicarboxylic acid or monoester thereof with an aliphatic $(C_1-C_8)$-alcohol, or mixture of these monomers, (b) 0.5 to 30% by weight of a surface-active crotonic acid ester of the general formula I $$CH_3-CH=CH-\overset{\overset{\displaystyle O}{\|}}{C}-O-(CH_2-CH_2-O)_n-R \quad \text{(I)}$$

in which
n denotes a number from 2 to 100 and
R denotes an aliphatic $(C_2-C_{30})$-radical, which can be linear or branched, a mono-, di- or tri-alkylphenyl radical with alkyl groups of in each case 4 to 12 carbon atoms or a block-copolymeric radical of the formula IIa or IIb $$-(CH-CH_2-O)_m-(CH_2-CH_2-O)_p-R^1 \quad \text{(IIa)}$$
$$\phantom{-(}|$$
$$\phantom{-(}CH_3$$

$$-(CH_2-CH-O)_m-(CH_2-CH_2-O)_p-R^1 \quad \text{(IIb)}$$
$$\phantom{-(CH_2-}|$$
$$\phantom{-(CH_2-}CH_3$$

in which
m represents a number from 10 to 100, p represents a number from 0 to 100 and
$R^1$ represents H, crotyl, $(C_1-C_{20})$-alkyl, phenyl or alkylphenyl with $(C_1-C_{20})$-alkyl groups, or
R denotes a perfluorinated or partially fluorinated $(C_1-C_{16})$-alkyl radical, (c) 30–85% by weight of methacrylic acid ester or acrylic acid ester of an aliphatic $(C_1-C_{18})$-alcohol or a mixture of these esters, (d) 0–40% by weight of other ethylenically unsaturated comonomer, (e) 0–3% by weight of polyethylenically unsaturated compound, and (f) 0–5% by weight of molecular weight regulator.

19. The process as claimed in claim 18, wherein the surface-active comonomer (b) is in the aqueous phase in the emulsion copolymerization.

20. A process as claimed in claim 18 which further comprises subsequent conversion of the resulting copolymer into a water-soluble or colloidally water-dispersible copolymer salt by partial or complete neutralization of free-acid groups with a base.

21. A process as claimed in claim 20 wherein the base is an alkali-metal, ammonium or amine base.

22. A process as claimed in claim 18 wherein (a) comprises methacrylic acid, acrylic acid, crotonic acid, a monoalkyl maleate or a mixture of two or more of these monomers.

23. A process as claimed in claim 18 wherein (d) comprises an ethylenically-unsaturated sulfonic acid, an ethylenically-unsaturated sulfonic acid derivative or at least one monomer other than (c) and selected from the group consisting of a vinyl ester, a vinyl aromatic, an ethylenically-unsaturated nitrile, an ethylenically-unsaturated monocarboxylic acid and an ethylenically-unsaturated dicarboxylic acid ester.

24. A process as claimed in claim 18 wherein (e) is divinylbenzene, diallyl phthalate, butanediol diacrylate or butanediol dimethacrylate.

25. A process as claimed in claim 18 wherein (f) is dodecylmercaptan, tetrakis-mercaptoacetyl-pentaerythritol, carbon tetrachloride or bromotrichloromethane.

26. A process for thickening an aqueous dispersion which comprises admixing therewith an effective amount of a copolymer as claimed in claim 1.

27. A process for thickening an aqueous dispersion which comprises admixing therewith an effective amount of a copolymer as claimed in claim 2.

28. A process for thickening an aqueous dispersion which comprises mixing an effective amount of copolymer as claimed in claim 1 in its acid form as a solution or dispersion with the aqueous dispersion and then partly or completely neutralizing the resulting mixture or rendering it weakly alkaline by addition of a base, so that the copolymer is present as a water-soluble or colloidally water-dispersible copolymer salt.

29. In a process for thickening emulsion paint, emulsion gloss lacquer, textile printing paste or paper printing paste by incorporating a thickening agent therein, the improvement wherein the thickening agent is a copolymer as claimed in claim 1.

30. In a process for thickening emulsion paint, emulsion gloss lacquer, textile printing paste or paper printing paste by incorporating a thickening agent therein, the improvement wherein the thickening agent is a copolymer in partly or completely base-neutralized, water-soluble or colloidally water-dispersible form as claimed in claim 2.

31. In a process for sizing in the textile industry with a sizing agent, the improvement wherein the sizing agent is a copolymer as claimed in claim 1.

* * * * *

UNITED STATES PATENT AND TRADEMARK OFFICE
CERTIFICATE OF CORRECTION

PATENT NO. : 4,569,965
DATED : February 11, 1986
INVENTOR(S) : Dieter ENGEL, Helmut RINNO, Klaus ZIMMERSCHIED It is certified that error appears in the above-identified patent and that said Letters Patent are hereby corrected as shown below:

Column 13, line 15, change "30" to --3--.

Signed and Sealed this

Twenty-seventh Day of May 1986

[SEAL]

Attest:

DONALD J. QUIGG

Attesting Officer     Commissioner of Patents and Trademarks